US010598917B2

(12) United States Patent
Chowaniec et al.

(10) Patent No.: US 10,598,917 B2
(45) Date of Patent: Mar. 24, 2020

(54) BORESCOPE GRIP (71) Applicant: United Technologies Corporation, Farmington, CT (US)

(72) Inventors: Michael D. Chowaniec, Newington, CT (US); Antony J. Giunta, Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 420 days.

(21) Appl. No.: 15/481,801

(22) Filed: Apr. 7, 2017

(65) Prior Publication Data
US 2018/0292640 A1 Oct. 11, 2018

(51) Int. Cl.
G02B 23/24 (2006.01)
F01D 21/00 (2006.01)
F01D 17/02 (2006.01)

(52) U.S. Cl.
CPC ......... *G02B 23/2407* (2013.01); *F01D 17/02* (2013.01); *F01D 21/003* (2013.01); *G02B 23/2476* (2013.01); *F05D 2230/72* (2013.01); *F05D 2230/80* (2013.01); *F05D 2260/83* (2013.01); *F05D 2270/804* (2013.01)

(58) Field of Classification Search
CPC .... G01N 21/954; G01N 21/952; G02B 23/16; G02B 23/2492; G02B 23/2407; G02B 23/2476; F05D 2260/83; F05D 2230/80
USPC ............. 356/241.1–241.6; 385/117; 415/118
See application file for complete search history.

(56) References Cited

U.S. PATENT DOCUMENTS

| 3,778,170 | A | 12/1973 | Howell et al. |
| 4,011,017 | A | 3/1977 | Feuerstein et al. |
| 4,565,423 | A | 1/1986 | Ueda |
| 4,659,195 | A | 4/1987 | DAmelio et al. |
| 5,052,803 | A | 10/1991 | Krauter |
| 5,114,406 | A * | 5/1992 | Gabriel ............... A61M 5/2033 604/134 |
| 5,365,331 | A | 11/1994 | Tamburrino et al. |
| 5,830,545 | A | 11/1998 | Frisk |
| 2005/0156008 | A1* | 7/2005 | Komazaki ............... B25C 1/043 227/10 |
| 2013/0038930 | A1 | 2/2013 | Vent |
| 2015/0013791 | A1 | 1/2015 | Banowetz et al. |
| 2016/0025210 | A1* | 1/2016 | Kujawski, Jr. ...... F16H 61/0009 137/315.01 |
| 2017/0241452 | A1* | 8/2017 | Lewendon ............ F15B 15/261 |

FOREIGN PATENT DOCUMENTS

EP 0907077 A2 4/1999

OTHER PUBLICATIONS

Search report for EP18166175.2 dated Jul. 13, 2018.

* cited by examiner

*Primary Examiner* — Hoa Q Pham
(74) *Attorney, Agent, or Firm* — Getz Balich LLC (57) ABSTRACT

Aspects of the disclosure are directed to a borescope grip defined about a central longitudinal axis, comprising: a reaction case that includes a first flange having a first face that is substantially perpendicular to a central longitudinal axis of the grip, an o-ring that abuts the first face of the first flange, a plunger that includes a second flange having a second face that abuts the o-ring at a first axial position and is disengaged from the o-ring at a second axial position, and a spring that abuts the second flange.

16 Claims, 12 Drawing Sheets

BORESCOPE GRIP

BACKGROUND

Gas turbine engines, such as those which power aircraft and industrial equipment, employ a compressor to compress air that is drawn into the engine and a turbine to capture energy associated with the combustion of a fuel-air mixture. Due to the enclosed and confined nature of many engines, an articulating borescope is used to confirm that: (1) devices of the engine are present, (2) the devices are assembled in an appropriate manner (e.g., are assembled in accordance with a procedure/specification), and/or (3) the devices are operable/functional (e.g., the devices are not degraded/fatigued).

Conventionally, borescopes are designed to only provide for minor articulation of the last, e.g., 2 to 3 inches (approximately 50 millimeters to 76 millimeters) where a camera (e.g., a still-frame camera or video camera) is included. Additional manipulation/maneuvering of a borescope typically requires manual action by the user/operator. A limited subset of tools are available to assist in such maneuvers, such that the user is required to provide a majority of the controlling force by hand. Consequently, in use borescopes are not ergonomic as the user's hand is subject to large loads (e.g., torsional and axial loads). The manipulation/use of borescopes tends to be tedious and can lead to repeated trials caused at least in part by fatigue. Additionally, the use of borescopes tends to provide inconsistent results. For example, factors such as the presence of externals (e.g., components such as tubes, wires, etc., that may be present in the space between the user's location and the engine hardware/device to be inspected/examined) and user stamina and experience can lead to different results under otherwise substantially similar (or even equivalent) conditions.

Accordingly, what is needed is a borescope that allows the user to exert a force in an ergonomic and comfortable manner with a mechanical advantage that reduces/minimizes any input load that may be needed.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a borescope grip defined about a central longitudinal axis, comprising: a reaction case that includes a first flange having a first face that is substantially perpendicular to a central longitudinal axis of the grip, an o-ring that abuts the first face of the first flange, a plunger that includes a second flange having a second face that abuts the o-ring at a first axial position and is disengaged from the o-ring at a second axial position, and a spring that abuts the second flange. In some embodiments, the reaction case includes a housing that comprises the o-ring, the plunger, and the spring. In some embodiments, the borescope grip further comprises a threaded cap that is coupled to a longitudinal end of the housing. In some embodiments, the reaction case includes a central core that extends along the central longitudinal axis. In some embodiments, the central core is integral with the threaded cap and projects from a surface of the threaded cap. In some embodiments, the plunger includes a cylinder wall that is positioned between the central core and the housing. In some embodiments, a first surface of the o-ring abuts the first flange, and a second surface of the o-ring that is opposed to the first surface abuts the second flange. In some embodiments, the borescope grip further comprises a trigger coupled to the plunger. In some embodiments, when a force applied to the trigger is less than a threshold the spring causes the o-ring to deform. In some embodiments, the deformation of the o-ring applies a clamping force to a borescope tube. In some embodiments, when a force applied to the trigger is greater than a threshold the spring is isolated from the o-ring such that the o-ring is in a released state. In some embodiments, when the o-ring is in the released state the borescope grip is able to move relative to a borescope tube. In some embodiments, the reaction case includes a central core and a third flange, and the reaction case is threaded onto the third flange. In some embodiments, the reaction case includes a housing, and the spring is located between the central core and the housing.

Aspects of the disclosure are directed to a method associated with a borescope grip, comprising: coupling a first surface of an o-ring to a first face of a first flange, coupling a second surface of the o-ring to a second face of a second flange, the second surface opposed to the first surface, and coupling a spring to the second flange. In some embodiments, the first flange is associated with a reaction case, and the second flange is associated with a plunger. In some embodiments, the method further comprises locating the spring between a core of the reaction case and a housing of the reaction case, and threading the core onto a third flange of the reaction case. In some embodiments, the method further comprises coupling a trigger to the plunger. In some embodiments, the method further comprises engaging the trigger to cause the plunger to traverse a distance aligned with a longitudinal axis of the borescope grip, and subsequent to engaging the trigger, disengaging the trigger, where disengaging the trigger cause the spring to expand such that the o-ring deforms between the first flange and the second flange to apply a clamping force to a borescope tube, and where engaging the trigger causes the spring to compress via the second flange such that the spring is isolated from the o-ring. In some embodiments, the method further comprises manufacturing the reaction case, the plunger, and the trigger from plastic using an additive manufacturing technique.

BRIEF DESCRIPTION OF THE DRAWINGS

The present disclosure is illustrated by way of example and not limited in the accompanying figures in which like reference numerals indicate similar elements. The drawing figures are not necessarily drawn to scale unless specifically indicated otherwise.

DETAILED DESCRIPTION

It is noted that various connections are set forth between elements in the following description and in the drawings (the contents of which are incorporated in this specification by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities or a space/gap between the entities that are being coupled to one another.

Figure 1:
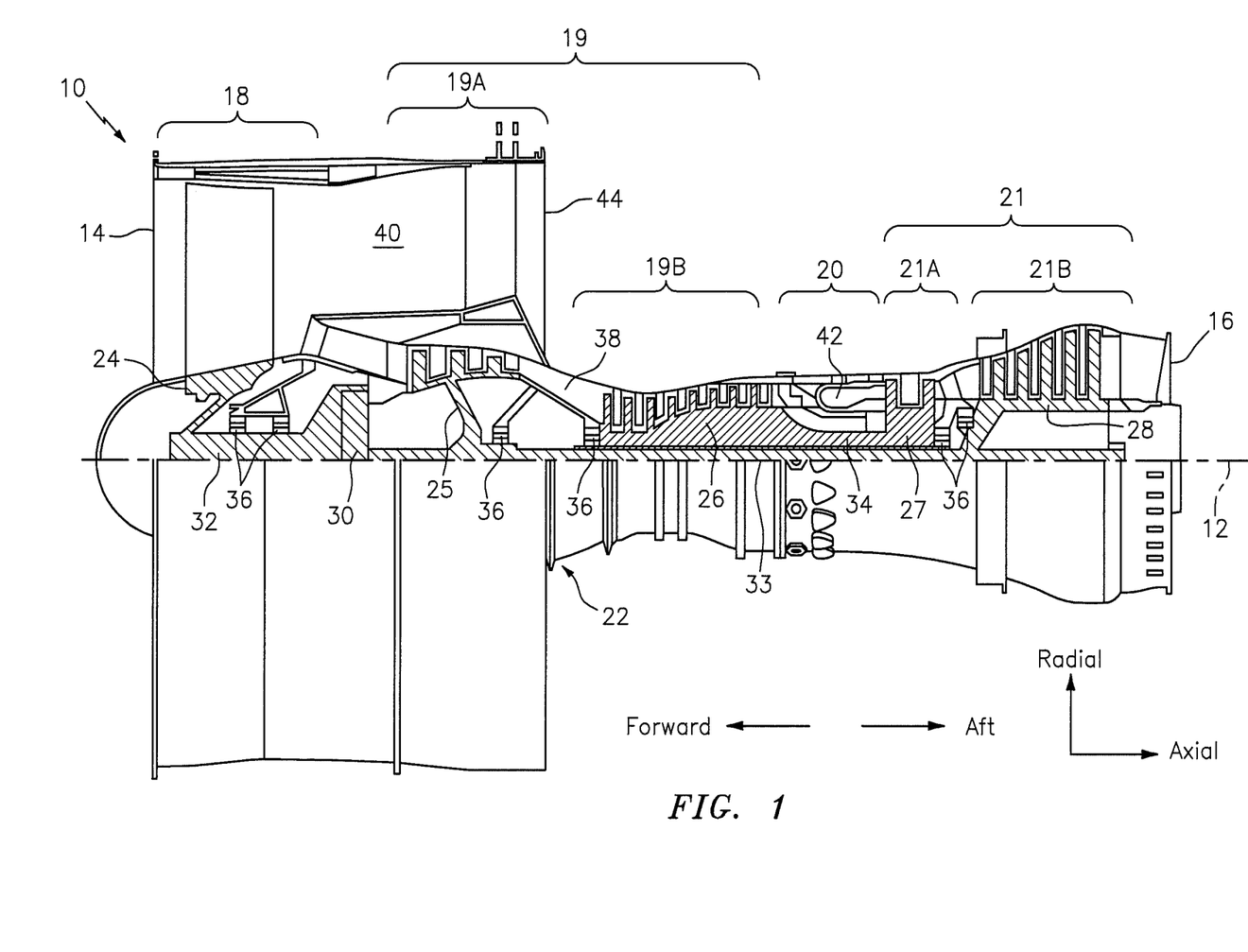
FIG. 1 is a side cutaway illustration of a geared turbine engine.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

As one skilled in the art will appreciate based on a review of this disclosure, in some embodiments a fan drive gear system (FDGS), which may be incorporated as part of the gear train 30, may be used to separate the rotation of the fan rotor 24 from the rotation of the rotor 25 of the low pressure compressor section 19A and the rotor 28 of the low pressure turbine section 21B. For example, such an FDGS may allow the fan rotor 24 to rotate at a different (e.g., slower) speed relative to the rotors 25 and 28.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for gas turbine engines. Aspects of the disclosure may be applied in connection with non-geared engines.

In accordance with aspects of the disclosure, a borescope may be used to inspect one or more sections of an engine (e.g., the engine 10 of FIG. 1). Before describing various embodiments of a borescope grip of the present disclosure in more detail, a few remarks are in order regarding the types of inspections that are typically performed on engines using a borescope. The inspections may generally be categorized into two classes/groups: (1) a rotational inspection, and (2) a wrapping inspection. In a rotational inspection, the borescope is typically inserted into a port of the engine casing and is held stationary while the engine hardware (e.g., a disk/rotor) rotates. In contrast, during a wrapping inspection the borescope is inserted into a port of the engine casing and the borescope is maneuvered/manipulated around the circumference of the engine hardware while the engine hardware is stationary; eventually, the borescope is removed. The removal of the borescope generally provides the most useful information in relation to the inspection, as the greatest amount of control over the borescope is exercised/available during removal. The borescopes described herein may be applied in connection with a rotational inspection or a wrapping inspection. Of course, the borescopes described herein may be applied in connection with other types of inspections as well.

Figure 2:
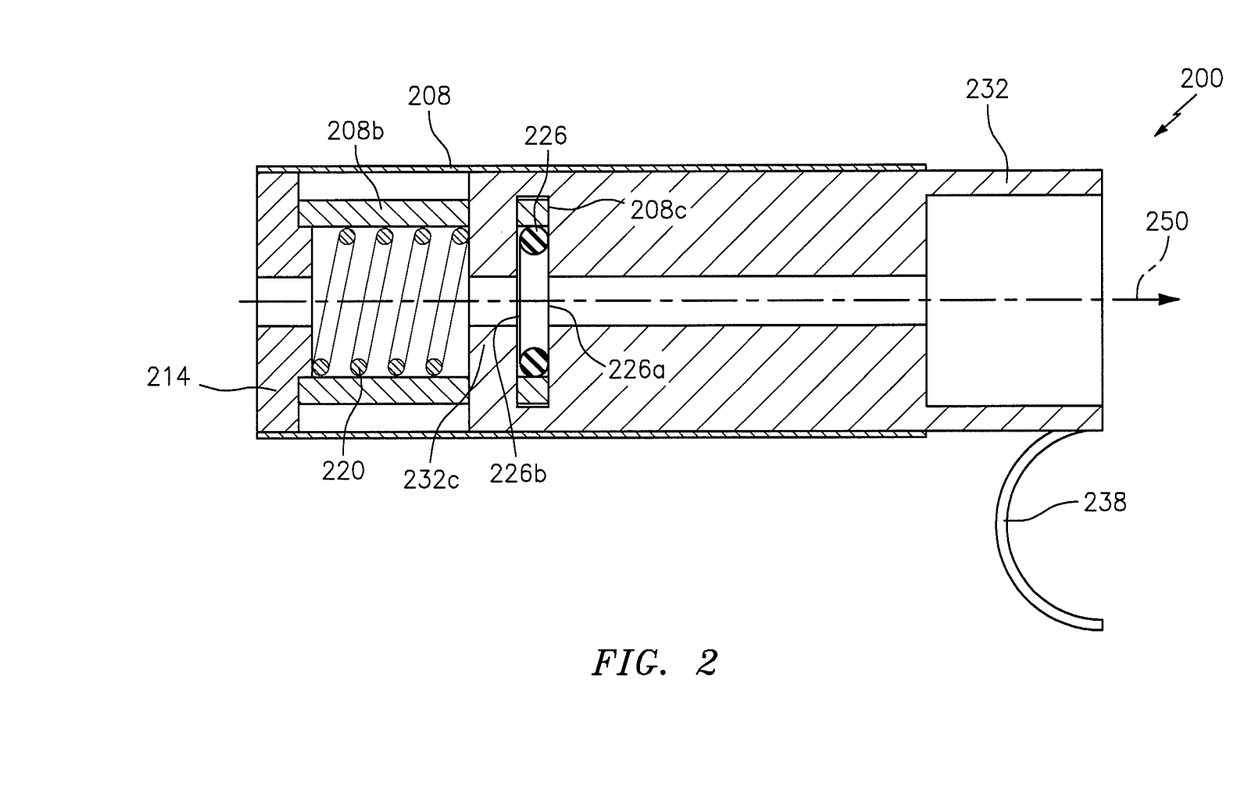
FIGS. 2-4 illustrate a first embodiment of a borescope grip in accordance with aspects of this disclosure.
Figure 3:
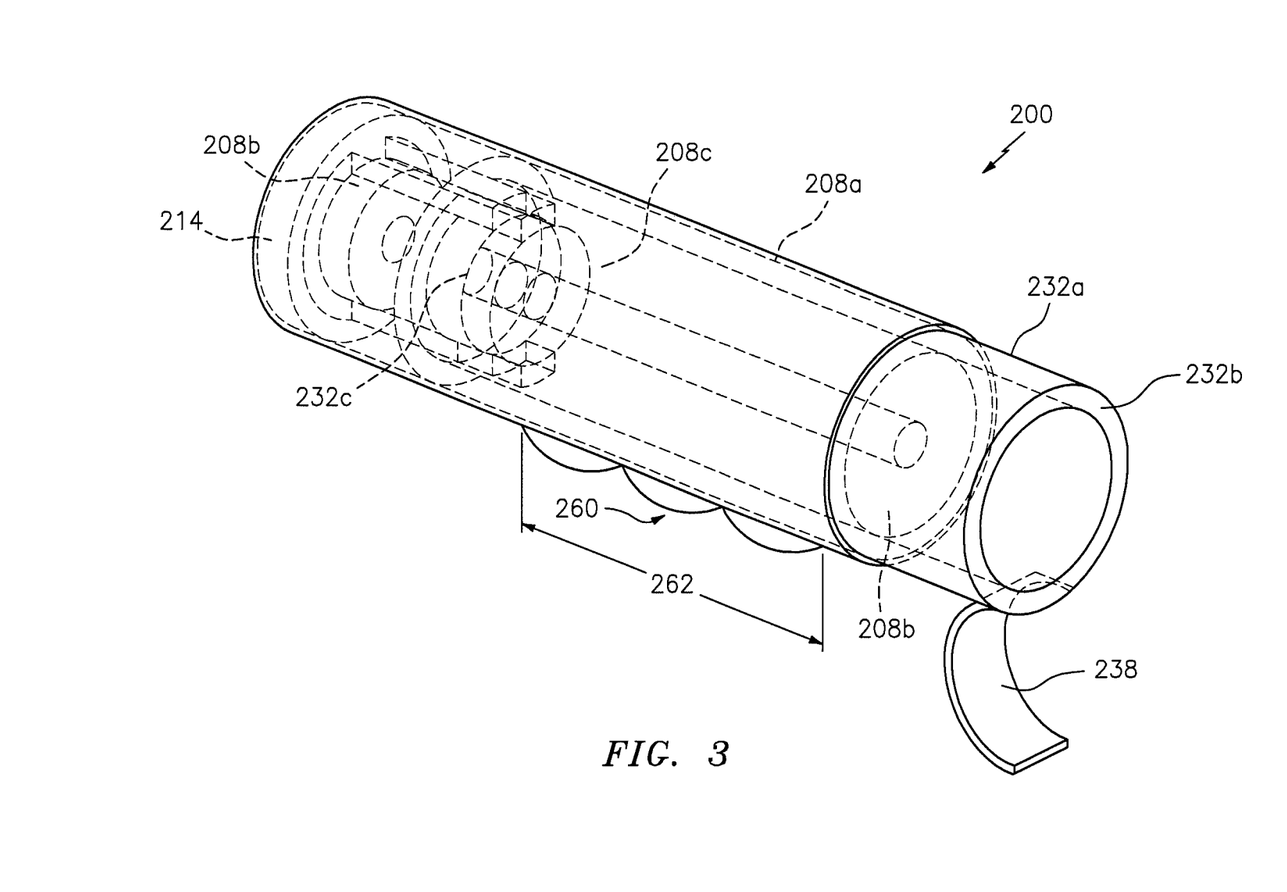
Figure 4:
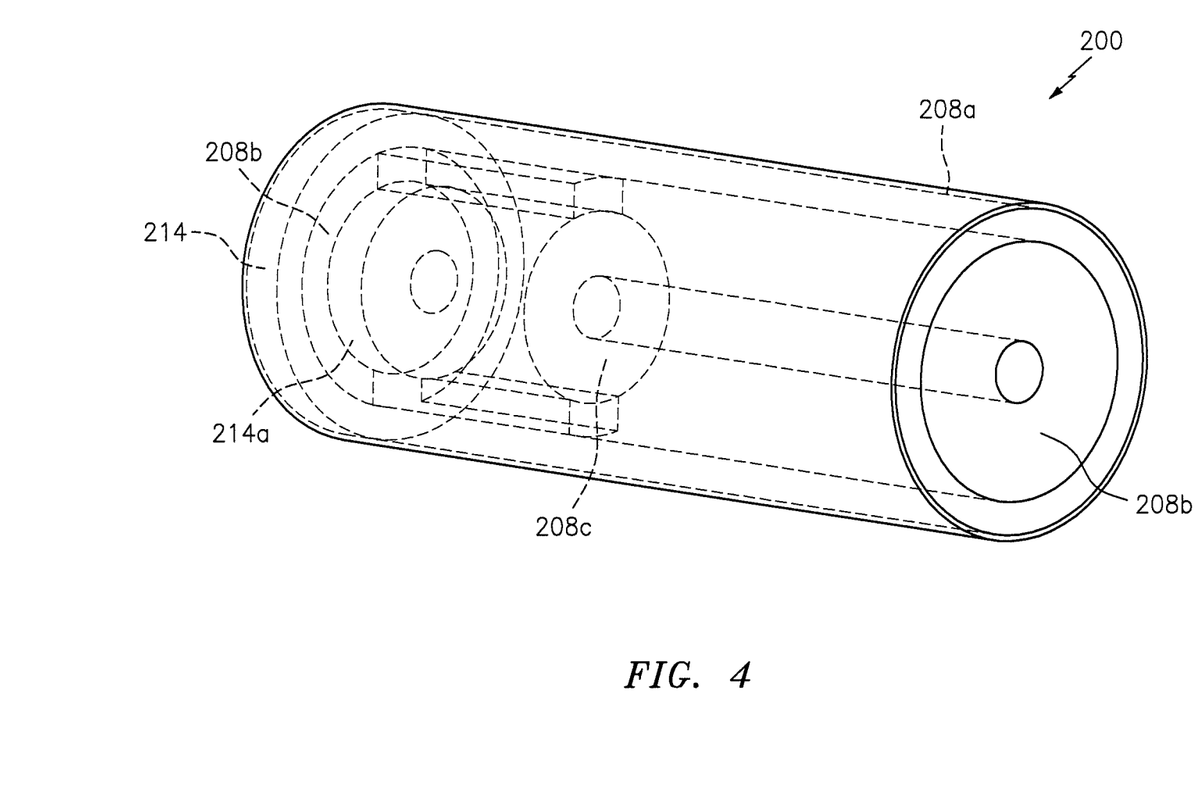

Referring to FIGS. 2-3, a borescope grip 200 for a borescope is shown. The borescope grip 200 may include one or more components, such as for example a reaction case 208, a cap 214, a spring 220, an o-ring 226, a plunger 232, and a trigger 238. In FIG. 2, the components 208-238 are shown arranged relative to one another and relative to a central longitudinal axis 250. The axis 250 may coincide with a borescope tube line of action, which is to say that a borescope tube (not specifically shown in FIG. 2) that is used to carry a camera (e.g., an articulating camera) may run substantially along the length of the axis 250. For purposes of this disclosure, the axis 250 may represent the borescope tube.

The components of the borescope grip 200 may be fabricated using one or more techniques. For example, one or more of the components (e.g., the reaction case 208, the cap 214, the plunger 232, and the trigger 238) may be manufactured from plastic using an additive manufacturing technique. In some embodiments, the manufacture of all or a portion of the grip 200 may incorporate a three-dimensional (3D) printing technique. In some embodiments, the spring 220 may be made of one or more materials, such as a metal (e.g., steel, aluminum, etc.). In some embodiments, the o-ring 226 may be made of one or more materials, such as for example rubber.

Referring to FIGS. 2-4 and 11A-11C, the reaction case 208 may include an outer housing/shell 208a and a central core 208b. The outer housing 208a may correspond to the portion of the case 208 that the user/operator interfaces to (e.g., the portion of the reaction case 208 that the user/ operator grips). The central core 208b may be integral with the cap 214. For example, the central core 208b may project from a side/surface 214a of the cap 214, where the surface 214a faces the interior of the borescope grip 200 when the borescope grip 200 is assembled. In some embodiments, the central core 208b may be coupled to the cap 214 using one or more fasteners (e.g., a screw and a nut), an adhesive, etc.

The cap 214 may be threaded such that the cap 214 may be selectively coupled to (or decoupled from) the outer housing 208a. The reaction case 208 (e.g., the central core 208b) may include a flange/flange face 208c that may abut the o-ring 226 on a first side/surface 226a of the o-ring 226. The flange 208c may remain in a fixed position (relative to the axis 250) once the borescope grip 200 has been assembled. As shown in FIG. 2, the flange 208c may project substantially in a radial direction (relative to the axis 250).

Referring to FIGS. 2 and 3, the plunger 232 may be formed as a hollow cylinder with a cylinder wall 232a that traverses a portion of the length of the grip 200. The cylinder wall 232a may be radially positioned between the central core 208b and the outer housing 208a.

Figure 5:
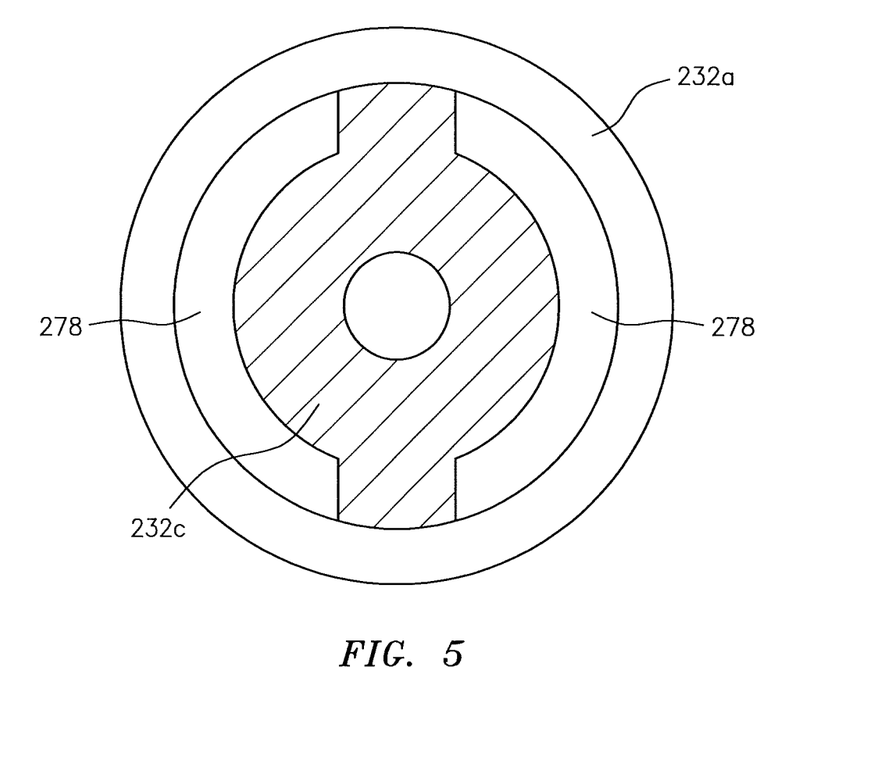
FIG. 5 illustrates a plunger flange of the borescope grip of FIGS. 2-4.
Figure 12:
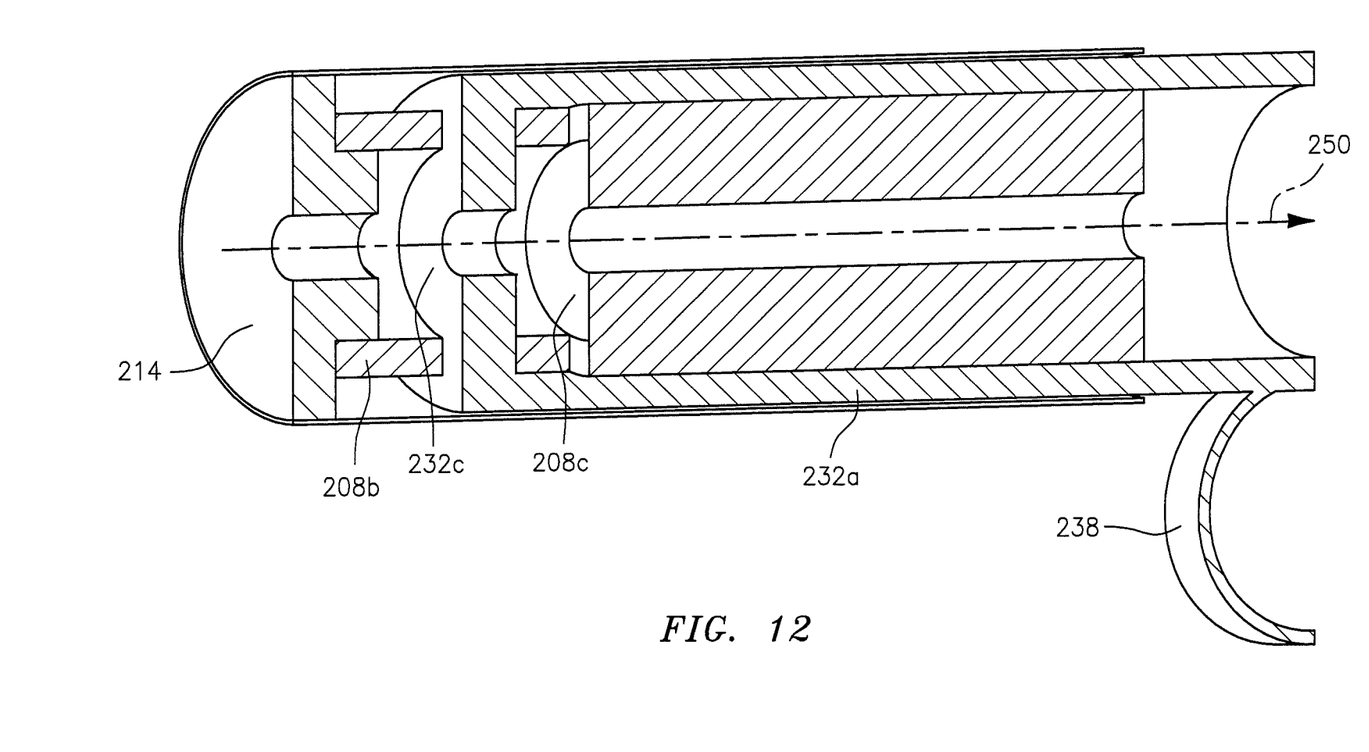
FIG. 12 illustrates a cross-section of a borescope grip in accordance with aspects of this disclosure.

A first, forward edge/face 232b of the plunger 232 may be coupled to the trigger 238. Referring to FIGS. 2, 5, and 12, a second, rear edge/face 232c of the plunger 232 may correspond to a plunger flange. The plunger flange/flange face 232c may project from the plunger cylinder wall 232a in a substantially radial direction (relative to the axis 250) as shown. In some embodiments, the plunger flange 232c may be scalloped in a way that "cups" the o-ring 226. In this respect, the plunger flange 232c might not necessarily be oriented perpendicular to the axis 250; one or more angles relative to the axis 250 may be used for the orientation of the plunger flange 232c. As shown in FIGS. 5 and 12, a portion of the central core 208b may project through/traverse one or more voids 278 located between the plunger cylinder wall 232a and the plunger flange 232c. Furthermore, a portion of the plunger flange 232c (illustratively shown in FIG. 12 as a crescent-shaped moon/half-circle) may be substantially radially contained within the central core 208b.

Referring to FIGS. 2 and 5, the plunger flange 232c may abut the o-ring 226 on a second side/surface 226b of the o-ring 226, where the second surface 226b is opposed to the first surface 226a. The plunger flange 232c may abut the spring 220 as described further below. In this respect, the plunger flange 232c may be disposed between the spring 220 and the o-ring 226 (relative to the axis 250). The spring 220 may be radially bounded by/contained within the central core 208b and axially bounded by the cap 214 and the plunger flange 232c.

Referring to FIGS. 2-5, in terms of use when the trigger 238 is disengaged (e.g., a user does not depress the trigger 238 or depresses the trigger 238 in an amount less than a threshold), the spring 220 may be in an uncompressed state/condition. When the spring 220 is in the uncompressed state, the spring 220 may bias the plunger flange 232c axially forward (e.g., to the right in FIG. 2) such that the plunger flange 232c may contact/push against the (second surface 226b of the) o-ring 226 at a first axial position. Due to the presence of the flange 208c of the reaction case 208, which is in contact with the first surface 226a of the o-ring 226, the force exerted by the spring 220 onto the o-ring 226 (via the plunger flange 232c) may cause the o-ring 226 to deform. This deformation of the o-ring 226 may apply a clamping force to the borescope tube to hold the borescope tube in a given position relative to the borescope grip 200.

Conversely, when the trigger 238 is engaged (e.g., a user depresses the trigger 238 in an amount greater than a threshold), the spring 220 may be in a compressed state/ condition. For example, when the trigger 238 is engaged the plunger flange 232c may axially move/translate towards the rear (e.g., to the left in FIG. 2) of the borescope grip 200 to a second axial position (where the second axial position is different from the first axial position when the trigger 238 is disengaged) and may cause the spring 220 to compress. When the spring 220 is compressed, the plunger flange 232c may not impart any appreciable force from the spring 220 onto the o-ring 226 (i.e., the spring 220 may be isolated from/impart less than a threshold amount of force on the o-ring 226), such that the o-ring 226 may be in a released/ non-deformed state/condition. When the o-ring 226 is in the released state, the borescope grip 200 may be able to move/slide along the borescope tube.

Thus, as described above, a user may operate the borescope grip 200 using one hand. For example, the user may use a first finger (e.g., an index finger) to operate the trigger 238 and may use one or more other fingers and/or the palm of the hand to move/slide the borescope grip 200 relative to the borescope tube. Such an arrangement frees the user's other hand to perform other tasks/operations.

In some embodiments, the borescope grip 200 (e.g., the housing 208a) may include a surface gripping feature 260 (see FIG. 3) that may accommodate a user's hand (e.g., one or more fingers of the user's hand). The surface gripping feature 260 may be located within a span 262 (see FIG. 3) of the borescope grip 200 that is proximate to the trigger 238. The surface gripping feature 260 may include a molded portion that conforms to the user's hand/fingers. While the surface gripping feature 260 is shown as including bumps/ ridges that project outwardly from the housing 208a, other shapes/configurations for the surface gripping feature 260 may be used. For example, the surface gripping feature 260 may be implemented similar to the molded portion for conforming to a user's fingers as disclosed in U.S. Pat. No. 6,830,545 (the contents of which are incorporated herein by way of reference).

As described above the borescope grip 200 (e.g., the spring 220 relative to the o-ring 226) may be biased such that when the trigger 238 is disengaged the borescope grip 200 remains stationary (relative to the borescope tube). Assuming that the borescope grip 200 remains stationary (relative to the borescope tube) for the vast majority of the time that the borescope is used, this implies a potential reduction/minimization in terms of user effort (e.g., applied force) that is required, thereby providing for an ergonomic and easy to use borescope.

Figure 6:
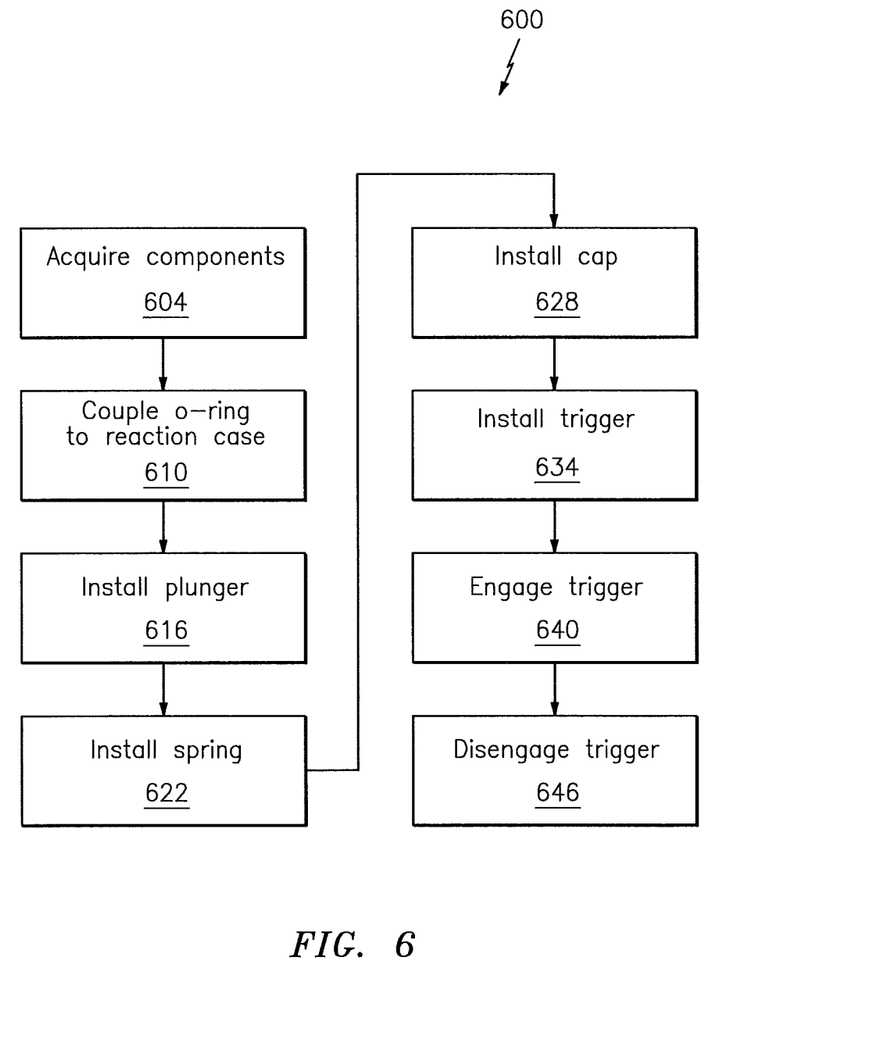
FIG. 6 illustrates a flow chart of a method for assembling and using a borescope grip in accordance with aspects of this disclosure.

Referring to FIG. 6, a method 600 of assembling a borescope grip is shown. While the method 600 is described below in relation to the illustrative borescope grip 200 described above, one skilled in the art will appreciate that the method 600 may be adapted to accommodate other types of borescope grips.

In block 604, the components of the borescope grip may be acquired. As part of block 604 one or more components of the borescope grip (e.g., the reaction case, the cap, the plunger, and the trigger) may be manufactured using a 3D printing technique.

In block 610, an o-ring may be coupled to (e.g., slid onto) the reaction case (e.g., the central core of the reaction case). As part of block 610, the o-ring may abut a flange of the reaction case. In some embodiments, the o-ring may be slightly deformed during assembly to clear/bypass the flange of the reaction case.

In block 616, a plunger may be installed. As part of block 616, a plunger flange of the plunger may be coupled to the reaction case (e.g., the central core of the reaction case) and/or the o-ring.

In block 622, a spring may be installed. As part of block 622, the spring may abut the plunger flange.

In block 628, a cap may be installed on, e.g., the reaction case (e.g., a housing of the reaction case). As part of block 628, the cap may be screwed onto/into the reaction case via threads that may be formed on the cap.

In block 634, a trigger may be installed. As part of block 634, a portion of the trigger may be inserted into a slot formed in the reaction case and/or a slot formed in the plunger in order to seat the trigger.

In block 640, the trigger may be engaged to cause the plunger to traverse a distance aligned with a longitudinal axis of the borescope grip. The engagement of the trigger may cause the plunger flange to disengage from the o-ring and the spring to compress, such that the spring is isolated from the o-ring.

In block 646, the trigger may be disengaged. Such disengagement may cause the spring to expand and the plunger flange to abut the o-ring, such that the o-ring deforms to apply a clamping force to a borescope tube.

The blocks of the method 600 described above are illustrative. In some embodiments, one or more portions of a given block may be optional. In some embodiments, the blocks may be executed in an order/sequence that is different from what is shown in FIG. 6. In some embodiments, additional blocks not shown may be included.

Figure 7:
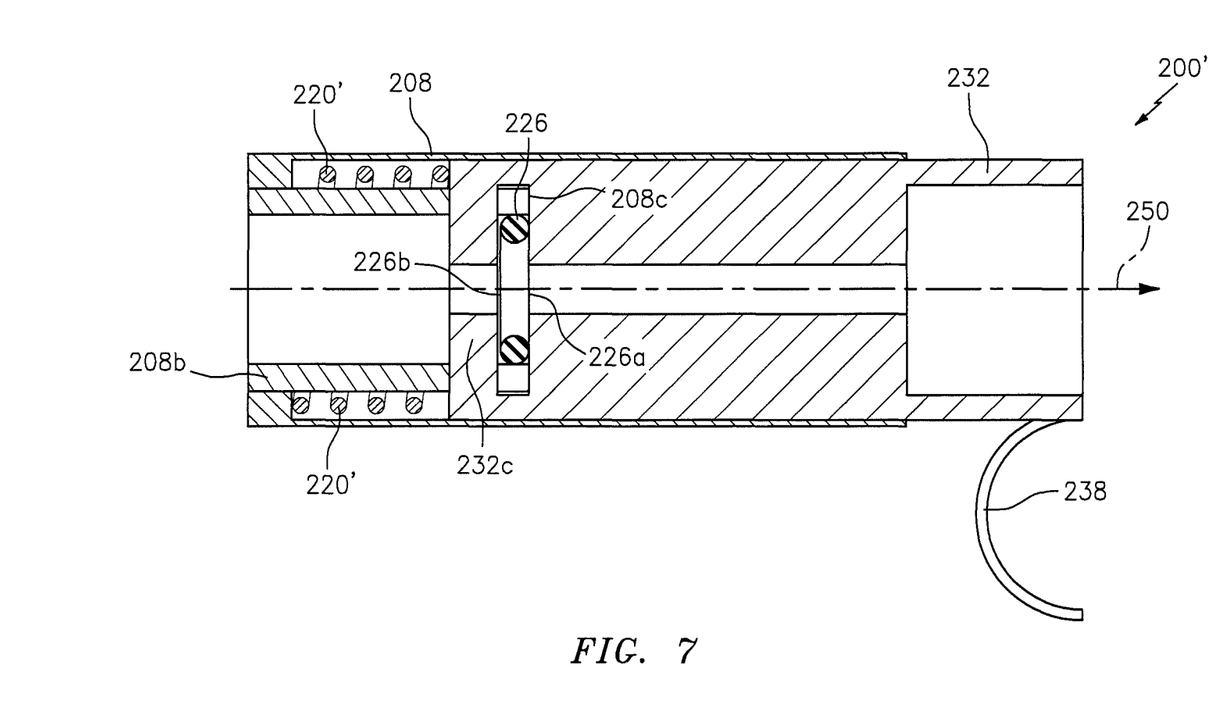
FIGS. 7-9 illustrate a second embodiment of a borescope grip in accordance with aspects of this disclosure.
Figure 8:
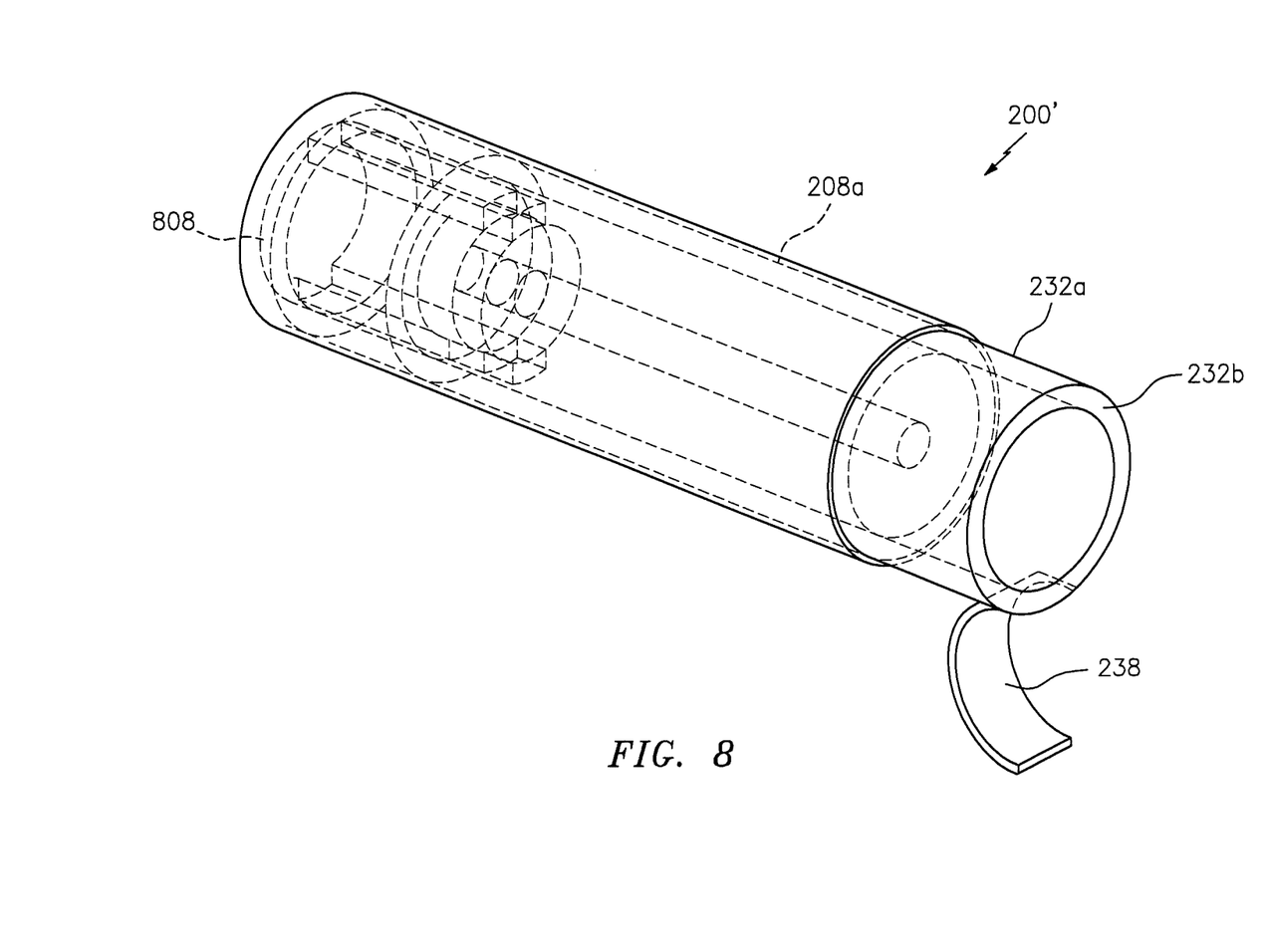
Figure 9:
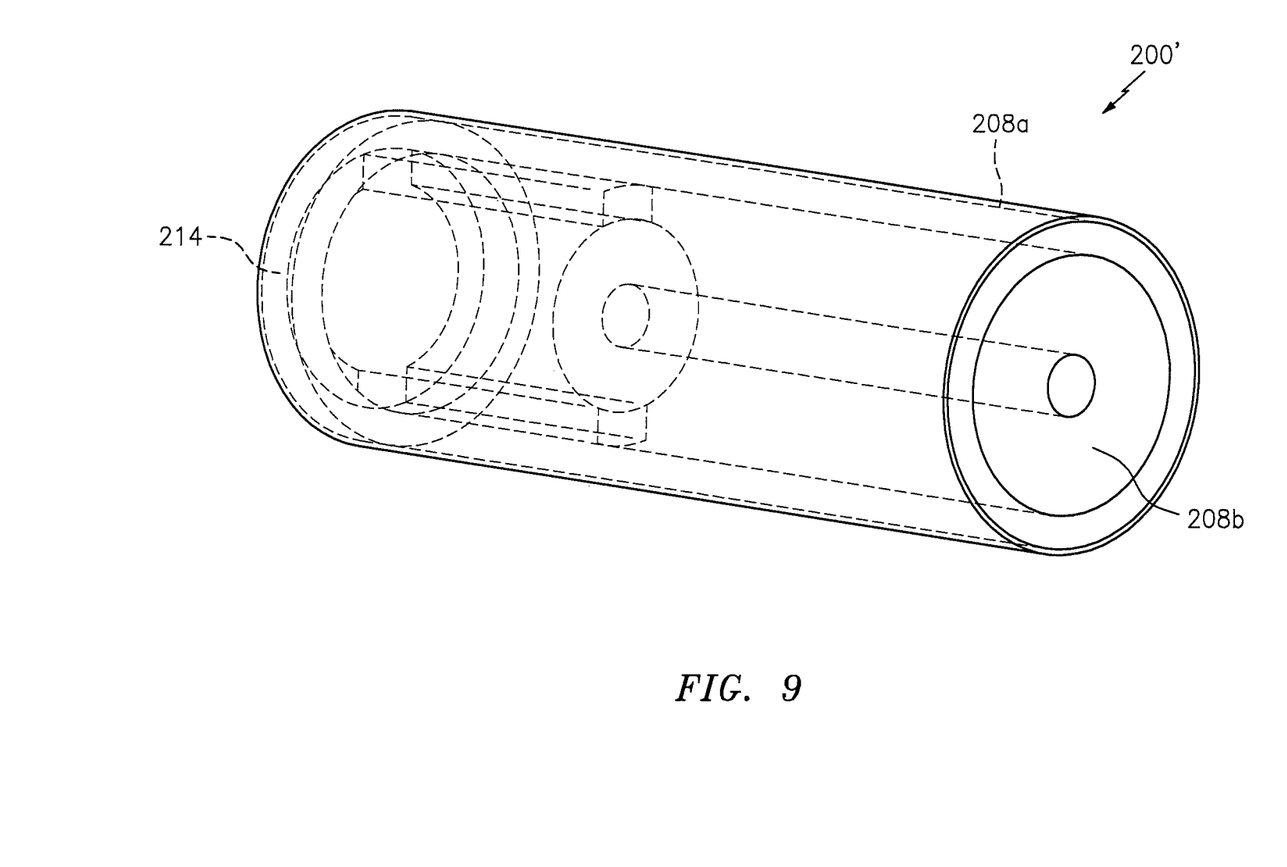

Referring now to FIGS. 7-9, an embodiment of a borescope grip 200' in accordance with aspects of this disclosure is shown. The borescope grip 200' includes many of the same components/devices described above in connection with the borescope grip 200; as such, a complete re-description of such components/devices in connection with the borescope grip 200' is omitted for the sake of brevity. In terms of differences between the borescope grip 200' and the borescope grip 200:

1) the borescope grip 200' may not include a threaded cap (e.g., cap 214). As part of the borescope grip 200', the central core 208b may be threaded and may be coupled (e.g., connected) to a rear fixed flange 808 of the reaction case 208.

2) in the borescope grip 200', a spring 220' may be located/positioned between the outer diameter (OD) of the central core 208b and the inner diameter (ID) of the outer housing 208a.

Figure 10:
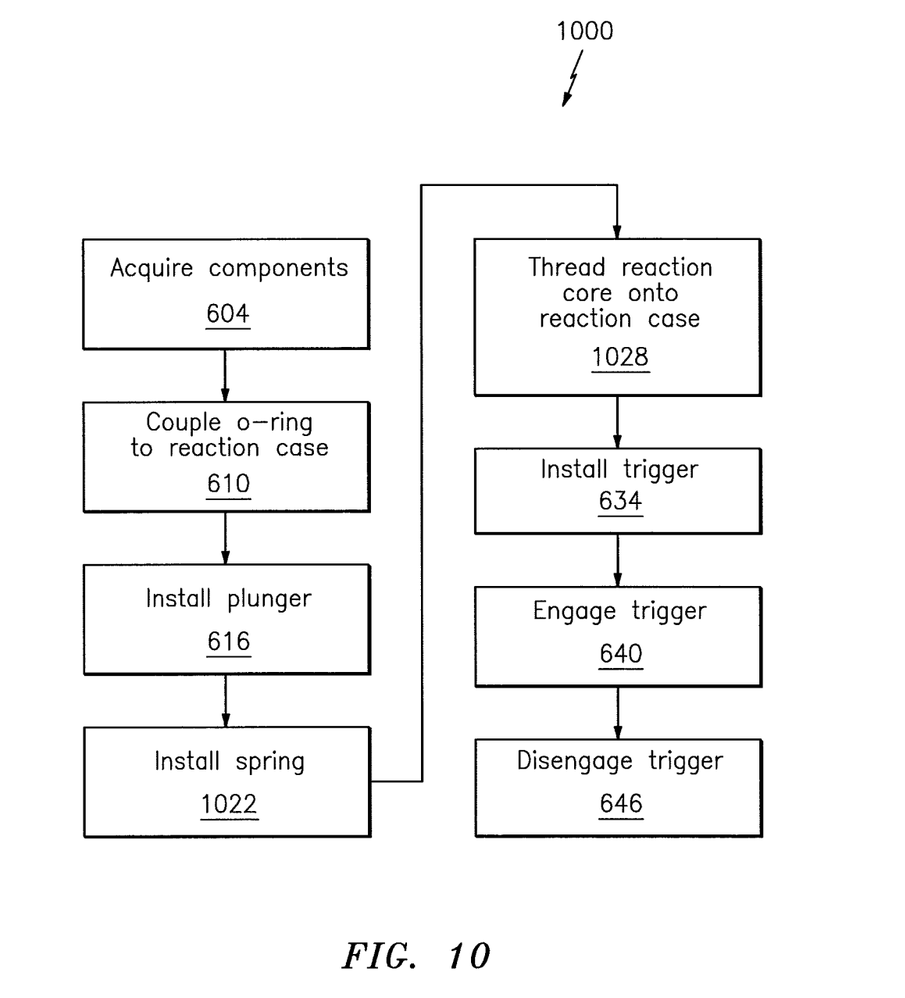
FIG. 10 illustrates a flow chart of a method for assembling and using a borescope grip in accordance with aspects of this disclosure.
Figure 11A:
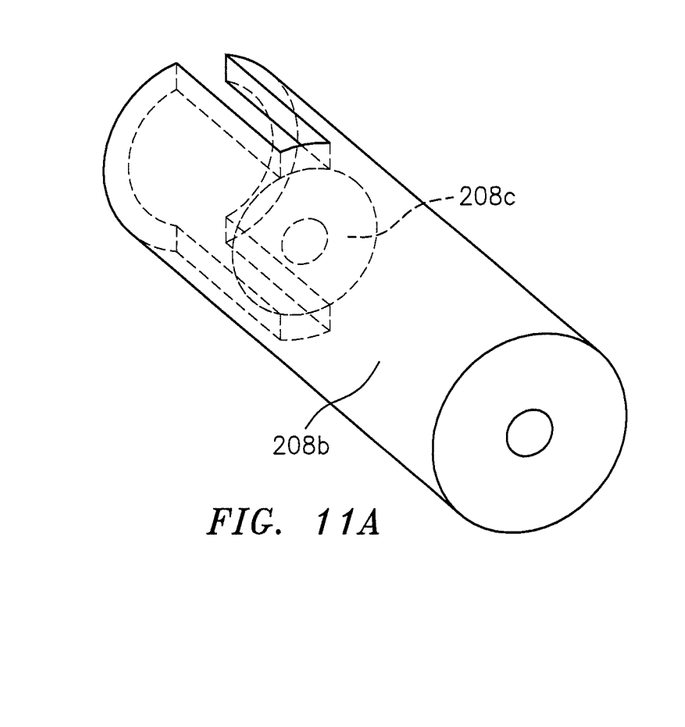
FIGS. 11A-11C illustrate a central core and a flange of a reaction case in accordance with aspects of this disclosure.
Figure 11B:
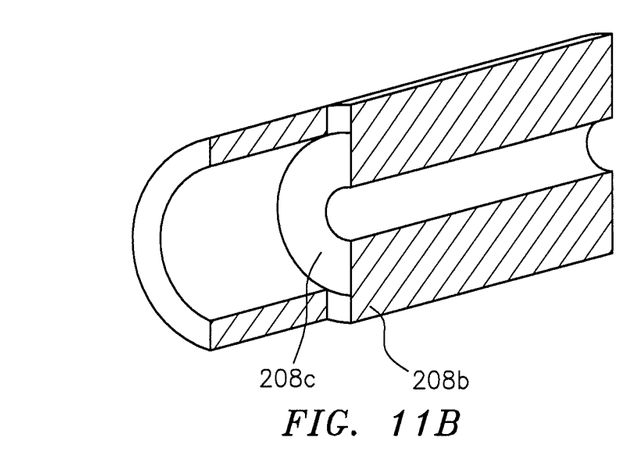
Figure 11C:
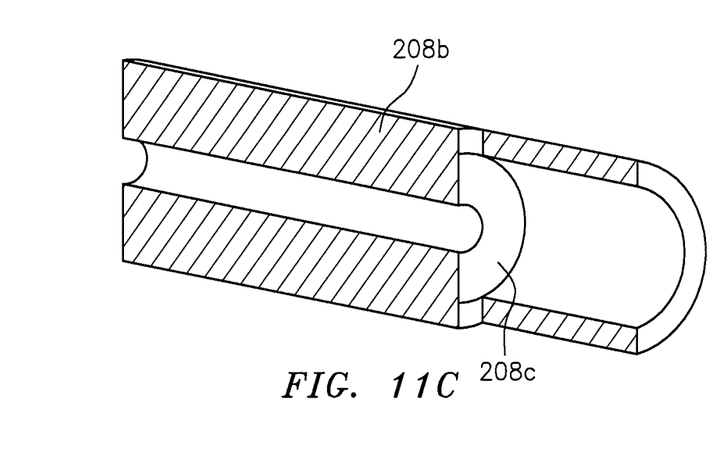

Referring to FIG. 10, a method 1000 of assembling a borescope grip is shown. While the method 1000 is described below in relation to the illustrative borescope grip 200' described above, one skilled in the art will appreciate that the method 1000 may be adapted to accommodate other types of borescope grips.

The method 1000 includes many of the same blocks/operations described above in connection with the method 600. As such, a complete re-description of such blocks/operations in connection with the method 1000 is omitted for the sake of brevity. In terms of differences between the method 600 and the method 1000:

1) in block 1022, a spring (e.g., the spring 220') may be installed. As part of that installation, the spring may be positioned between the OD of the central core and the ID of the outer housing as described above.

2) in block 1028, the reaction core may be threaded onto the reaction case (e.g., a flange of the reaction case).

The blocks of the method 1000 described above are illustrative. In some embodiments, one or more portions of a given block may be optional. In some embodiments, the blocks may be executed in an order/sequence that is different from what is shown in FIG. 10. In some embodiments, additional blocks not shown may be included.

Technical effects and benefits of this disclosure include an ability to manipulate a borescope (e.g., a borescope grip and/or a borescope tube) via application of a physical force to the borescope to either feed the scope forward or backward or rotate the borescope in place. A borescope grip in accordance with this disclosure may be easily (re)positioned as an insertion operation progresses. Aspects of the disclosure include a spring-loaded plunger that applies a crushing force on an o-ring when the borescope is in a resting/stationary position. Due to this configuration, user input may only be needed to relocate the borescope, thereby allowing use of the borescope without requiring unnecessary physical exertion. In this manner, a borescope grip in accordance with this disclosure may be both ergonomic in terms of use and maneuverability as well as providing a mechanical advantage when applying torque due to the presence of a large lever arm on the borescope tube.

While some of the illustrative embodiments and examples described herein pertain to a borescope used in relation to an (inspection of an) engine, aspects of the disclosure may be used in relation to other applications/environments. Aspects of the disclosure may be applied in relation to medical devices. For example, aspects of the disclosure may be incorporated as part of an endoscope or catheter, where such devices may be used as part of one or more medical examinations or procedures.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A borescope grip defined about a central longitudinal axis, comprising:
    a reaction case that includes a first flange having a first face that is substantially perpendicular to a central longitudinal axis of the grip;
    an o-ring that abuts the first face of the first flange;
    a plunger that includes a second flange having a second face that abuts the o-ring at a first axial position and is disengaged from the o-ring at a second axial position;
    a spring that abuts the second flange; and
    a trigger coupled to the plunger,
    wherein when a force applied to the trigger is less than a threshold the spring causes the o-ring to deform.

2. The borescope grip of claim 1, wherein the reaction case includes a housing that comprises the o-ring, the plunger, and the spring.

3. The borescope grip of claim 2, further comprising:
    a threaded cap that is coupled to a longitudinal end of the housing.

4. The borescope grip of claim 3, wherein the reaction case includes a central core that extends along the central longitudinal axis.

5. The borescope grip of claim 4, wherein the central core is integral with the threaded cap and projects from a surface of the threaded cap.

6. The borescope grip of claim 4, wherein the plunger includes a cylinder wall that is positioned between the central core and the housing.

7. The borescope grip of claim 1, wherein a first surface of the o-ring abuts the first flange, and wherein a second surface of the o-ring that is opposed to the first surface abuts the second flange.

8. The borescope grip of claim 1, wherein the deformation of the o-ring applies a clamping force to a borescope tube.

9. The borescope grip of claim 1, wherein when a force applied to the trigger is greater than a threshold the spring is isolated from the o-ring such that the o-ring is in a released state.

10. The borescope grip of claim 9, wherein when the o-ring is in the released state the borescope grip is able to move relative to a borescope tube.

11. The borescope grip of claim 1, wherein the reaction case includes a central core and a third flange, and wherein the central core is threaded onto the third flange.

12. The borescope grip of claim 11, wherein the reaction case includes a housing, and wherein the spring is located between the central core and the housing.

13. A method associated with a borescope grip, comprising:
coupling a first surface of an o-ring to a first face of a first flange associated with a reaction case;
coupling a second surface of the o-ring to a second face of a second flange associated with a plunger, the second surface opposed to the first surface;
coupling a spring to the second flange;
locating the spring between a core of the reaction case and a housing of the reaction case; and
threading the core onto a third flange of the reaction case.

14. The method of claim 13, further comprising:
coupling a trigger to the plunger.

15. The method of claim 14, further comprising:
engaging the trigger to cause the plunger to traverse a distance aligned with a longitudinal axis of the borescope grip; and
subsequent to engaging the trigger, disengaging the trigger,
wherein disengaging the trigger causes the spring to expand such that the o-ring deforms between the first flange and the second flange to apply a clamping force to a borescope tube, and
wherein engaging the trigger causes the spring to compress via the second flange such that the spring is isolated from the o-ring.

16. The method of claim 14, further comprising:
manufacturing the reaction case, the plunger, and the trigger from plastic using an additive manufacturing technique.

\* \* \* \* \*